(12) United States Patent
Luukkainen (10) Patent No.: US 8,615,624 B2
(45) Date of Patent: Dec. 24, 2013

(54) METHODS, APPARATUSES, AND COMPUTER PROGRAM PRODUCTS FOR ENHANCING MEMORY ERASE FUNCTIONALITY

(71) Applicant: Core Wireless Licensing S.a.r.l., Luxembourg (LU)

(72) Inventor: Olli Olavi Luukkainen, Salo (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

(21) Appl. No.: 13/771,868

(22) Filed: Feb. 20, 2013

(65) Prior Publication Data

US 2013/0159613 A1 Jun. 20, 2013

Related U.S. Application Data

(63) Continuation of application No. 12/324,099, filed on Nov. 26, 2008, now Pat. No. 8,407,401.

(51) Int. Cl.
G06F 12/00 (2006.01)
G06F 13/00 (2006.01)
G06F 13/28 (2006.01)

(52) U.S. Cl.
USPC .................................................. 711/103

(58) Field of Classification Search
USPC .................................................. 711/103
See application file for complete search history.

(56) References Cited

U.S. PATENT DOCUMENTS

| 4,498,146 | A  |   | 2/1985  | Martinez |
|-----------|----|---|---------|----------|
| 5,369,616 | A  | * | 11/1994 | Wells et al. ............ 365/185.22 |
| 6,237,000 | B1 |   | 5/2001  | Dahlen et al. |
| 6,665,815 | B1 |   | 12/2003 | Goldstein et al. |
| 6,967,869 | B1 |   | 11/2005 | Kolokowsky |
| 2003/0163633 | A1 |   | 8/2003 | Aasheim et al. |
| 2004/0059878 | A1 |   | 3/2004 | Madany |
| 2004/0213070 | A1 |   | 10/2004 | Ueno |
| 2005/0257017 | A1 | * | 11/2005 | Yagi ............................ 711/163 |
| 2006/0117393 | A1 |   | 6/2006 | Merry et al. |
| 2006/0184718 | A1 |   | 8/2006 | Sinclair et al. |
| 2007/0136509 | A1 |   | 6/2007 | Agami |
| 2008/0155301 | A1 | * | 6/2008 | Ahvenainen et al. ............ 714/1 |
| 2008/0201392 | A1 |   | 8/2008 | Nakajima et al. |

FOREIGN PATENT DOCUMENTS

| EP | 0887735    | 12/1998 |
| JP | 2008003892 | 1/2008  |
| JP | 4164118    | 10/2008 |
| WO | 2005026963 | 3/2005  |

* cited by examiner

*Primary Examiner* — Matthew Bradley
*Assistant Examiner* — Craig Goldschmidt
(74) *Attorney, Agent, or Firm* — Winstead PC (57) ABSTRACT

A method, apparatus, and computer program product are provided for enhancing memory erase functionality. An apparatus may include a block-based mass memory and a controller configured to receive an erase command from a host device comprising an indication of a location of a block in the mass memory storing memory allocation data. The controller may be further configured to access the memory allocation data based at least in part upon the indicated location. The controller may additionally be configured to determine, based at least in part upon the memory allocation data, blocks within the mass memory that have been freed by the host device. The controller may also be configured to erase the freed blocks. Corresponding methods and computer program products are also provided.

21 Claims, 3 Drawing Sheets

METHODS, APPARATUSES, AND COMPUTER PROGRAM PRODUCTS FOR ENHANCING MEMORY ERASE FUNCTIONALITY

CROSS-REFERENCE TO RELATED APPLICATIONS

This application is a continuation of U.S. application Ser. No. 12/324,099 filed Nov. 26, 2008, which is hereby incorporated by reference in its entirety.

TECHNOLOGICAL FIELD

Embodiments of the present invention relate generally to computing technology and, more particularly, relate to methods, apparatuses, and computer program products for enhancing memory erase functionality.

BACKGROUND

The modern computing era has brought about a tremendous expansion in use, power, capabilities, and portability of computing devices. Mobile computing devices, such as cellular phones, personal digital assistants, digital cameras, media players, and other portable electronic devices have evolved from luxury items to ubiquitous devices integrated into the everyday lives of individuals from all walks of life. Concurrent with the rise in use and power of mobile computing devices, personal computing devices, such as desktop and laptop computers, have continued to serve as integral computing platforms often used to access, manage, and exchange data with mobile computing devices.

Helping to fuel this expansion in computing device technology is an evolution in the capacity of memory in conjunction with a reduction in the price per unit of memory. Accordingly, computing devices and users and manufacturers of computing devices have access to higher capacity memory at a lower cost. This increased memory capacity and reduced memory cost is important, as users often utilize computing devices to store large files, such as media files, and often transfer files between their computing devices, often requiring management and rewriting of data stored on a memory.

One memory technology that has proven particularly useful is non-volatile block-based memory, such as flash memory. Flash memory has proven to be particularly useful, since as non-volatile memory, flash memory does not require any power to maintain data stored on the memory. Additionally, flash memory can be electrically erased and reprogrammed. Accordingly, flash memory has proven to be particularly useful for usage in mobile computing devices, where data is frequently overwritten and limiting power consumption is a concern. Additionally, the small size and large capacity of some flash memory devices, such as universal serial bus (USB) flash drives, facilitates the transfer of data between computing devices.

However, flash memory has some drawbacks. Although smaller subunits of a block of flash memory can be read and programmed, as a block-based memory, it can only be erased a block at a time. In this regard, a flash memory is divided into a plurality of units known as "blocks," which have a defined size, often of several bytes. Further, before rewriting a byte or block of memory that has already been written to, the entire block must be erased so as to return the block to its initial state prior to performing a write operation. Erasing a block before overwriting the block has consequences in that blocks of mass memory have a finite lifespan in that a block can only be written to a finite number of times before it is no longer writeable. Further, the requirement to erase an entire block prior to rewriting a subunit within the block may result in a noticeable latency between a write request and the actual write operation. Additionally, this requirement may result in a significant amount of data transfer overhead over a memory bus, particularly if an erase operation is performed immediately prior to a write operation in response to a write request.

Accordingly, it would be advantageous to provide methods, apparatuses, and computer program products for enhancing memory erase functionality.

BRIEF SUMMARY OF SOME EXAMPLES OF THE INVENTION

A method, apparatus, and computer program product are therefore provided for enhancing memory erase functionality. In this regard, embodiments of the invention provide methods, apparatuses, and computer program products for providing an erase command informing a controller unit embodied on a mass memory of free blocks on the mass memory so that the controller unit can erase the free blocks as necessary without requiring the controller unit to have any knowledge of an underlying file system. Embodiments of the invention utilize the erase command to enable pre-erasing of blocks marked as free by the host device prior to overwriting of the freed blocks. Pre-erasing in at least some embodiments of the invention speeds up write performance since there is not a need to wait for erasure of the blocks to which data is being written before the data is actually written. Embodiments of the invention further utilize the erase command to optimize timing of erasing so as not to tax computing resources.

In a first exemplary embodiment, a method is provided, which may include receiving, at a controller embodied on a block-based mass memory, an erase command from a host device in communication with the mass memory such that the host device has ability to read from and write to the mass memory. The erase command may comprise an indication of a location of a block in the mass memory storing memory allocation data for one or more blocks of the mass memory. The method may further include accessing the memory allocation data based at least in part upon the indicated location. The method may additionally include determining, based at least in part upon the memory allocation data, blocks within the mass memory that have been freed by the host device. The method may also include erasing the freed blocks.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for receiving, at a controller embodied on a block-based mass memory, an erase command from a host device in communication with the mass memory such that the host device has ability to read from and write to the mass memory. The erase command may comprise an indication of a location of a block in the mass memory storing memory allocation data for one or more blocks of the mass memory. The second program instruction is for accessing the memory allocation data based at least in part upon the indicated location. The third program instruction is for determining, based at least in part upon the memory allocation data, blocks within the mass memory that have been freed by the host device. The fourth program instruction is for erasing the freed blocks.

In another exemplary embodiment, an apparatus is provided, which may include a block-based mass memory and a controller. The controller may be configured to receive an erase command from a host device comprising an indication of a location of a block in the mass memory storing memory allocation data. The controller may be further configured to access the memory allocation data based at least in part upon the indicated location. The controller may additionally be configured to determine, based at least in part upon the memory allocation data, blocks within the mass memory that have been freed by the host device. The controller may also be configured to erase the freed blocks.

In another exemplary embodiment, an apparatus is provided, which may include means for receiving, at a controller embodied on a block-based mass memory, an erase command from a host device in communication with the mass memory such that the host device has ability to read from and write to the mass memory. The erase command may comprise an indication of a location of a block in the mass memory storing memory allocation data for one or more blocks of the mass memory. The apparatus may further include means for accessing the memory allocation data based at least in part upon the indicated location. The apparatus may additionally include means for determining, based at least in part upon the memory allocation data, blocks within the mass memory that have been freed by the host device. The apparatus may also include means for erasing the freed blocks.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

FIG. 1 illustrates a system for enhancing memory erase functionality according to an exemplary embodiment of the present invention;

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, a "block-based memory" refers to a non-volatile memory arranged into units known as "blocks." These blocks are also sometimes referred to as "allocation units" or "clusters." Each block within a block-based memory has a predefined size, (e.g., 512 bytes), which may be defined by a file system used to format the block-based memory. Each block is comprised of smaller subunits (e.g., a bit, byte, sector, page, and/or the like for example) that are individually readable and writable by a computing device controlling or otherwise having access to a block-based memory. However, block-based memory is only block erasable such that the smallest unit of a block-based memory that is erasable is a block rather than an individual byte or other subunit of a block. Further, once data has been written to a unit of a block-based memory (e.g., a bit, byte, sector, page, block, or other unit), the block containing the unit must be erased so as to return the block to its initial state prior to a write operation to overwrite the data or to otherwise write new data to the unit. An example embodiment of a block-based memory is flash memory. However, a block-based memory as used herein is not limited to embodiment as flash memory.

FIG. 1 illustrates a block diagram of a system 100 for enhancing memory erase functionality according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for enhancing memory erase functionality, numerous other configurations may also be used to implement embodiments of the present invention.

Referring now to FIG. 1, the system 100 includes a host device 102 and mass memory 104 interfaced over the interface 106. The host device 102 may be embodied as any computing device, mobile or fixed, including, for example, a personal computer, mobile terminal, mobile computer, mobile phone, mobile communication device, game device, digital camera/camcorder, audio/video player, television device, radio receiver, digital video recorder, positioning device, digital media player (e.g., a mobile video player, MP3 player, and/or the like), any combination thereof, and/or the like.

Figure 2:
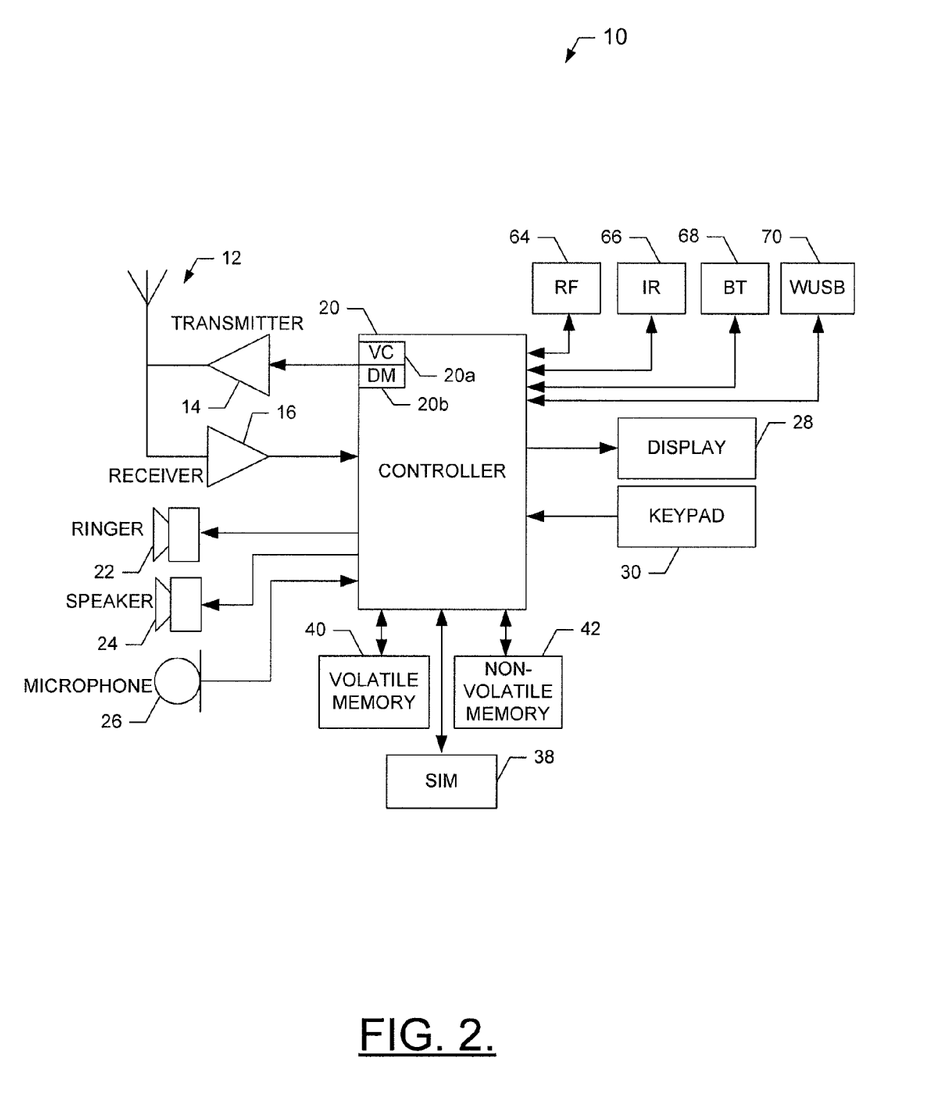
FIG. 2 is a schematic block diagram of a mobile terminal according to an exemplary embodiment of the present invention.

In an exemplary embodiment, the host device 102 is embodied as a mobile terminal, such as that illustrated in FIG. 2. In this regard, FIG. 2 illustrates a block diagram of a mobile terminal 10 representative of one embodiment of a host device 102 in accordance with embodiments of the present invention. It should be understood, however, that the mobile terminal illustrated and hereinafter described is merely illustrative of one type of host device 102 that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20*a*, an internal data modem (DM) 20*b*, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. As used herein, "operationally coupled" may include any number or combination of intervening elements (including no intervening elements) such that operationally coupled connections may be direct or indirect and in some instances may merely encompass a functional relationship between components. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40, non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, the host device 102 is not limited to being embodied as a mobile terminal 10 and as previously described, may be embodied as any computing device. In an exemplary embodiment, the host device 102 includes various means, such as a processor 110, memory 112, and file system management unit 114 for performing the various functions herein described. These means of the host device 102 as described herein may be embodied as, for example, hardware elements (e.g., a suitably programmed processor, combinational logic circuit, and/or the like), computer code (e.g., software or firmware) embodied on a computer-readable medium (e.g. memory 112) that is executable by a suitably configured processing device (e.g., the processor 110), or some combination thereof. The processor 110 may, for example, be embodied as various means including a microprocessor, a coprocessor, a controller, or various other processing elements including integrated circuits such as, for example, an ASIC (application specific integrated circuit) or FPGA (field programmable gate array). In embodiments wherein the host device 102 is embodied as a mobile terminal 10, the processor 110 may be embodied as or otherwise comprise the controller 20. In an exemplary embodiment, the processor 110 is configured to execute instructions stored in a memory (e.g., the memory 112) or otherwise accessible to the processor 110. Although illustrated in FIG. 1 as a single processor, in some embodiments the processor 110 comprises a plurality of processors. The plurality of processors may accordingly operate cooperatively to implement the functionality of the processor 110 as described herein.

The memory 112 may include, for example, volatile and/or non-volatile memory. In an exemplary embodiment, the memory 112 is configured to store information, data, applications, instructions, or the like for enabling the host device 102 to carry out various functions in accordance with exemplary embodiments of the present invention. For example, the memory 112 may be configured to buffer input data for processing by the processor 110. Additionally or alternatively, the memory 112 may be configured to store instructions for execution by the processor 110. The memory 112 may store static and/or dynamic information. This stored information may be stored and/or used by the file system management unit 114 during the course of performing its functionalities.

The file system management unit 114 may be embodied as various means, such as hardware, software, firmware, or some combination thereof and, in one embodiment, may be embodied as or otherwise controlled by the processor 110. In embodiments where the file system management unit 114 is embodied separately from the processor 110, the file system management unit 114 may be in communication with the processor 110. In an exemplary embodiment, the file system management unit 114 is in communication with the mass memory 104 and/or controller unit 120 via the interface 106. The file system management unit 114 may comprise, execute, or otherwise control file system software, firmware, and/or the like of the host device 102 for managing memory allocation in the mass memory 104. Accordingly, the file system management unit 114 is configured in at least some embodiments to load memory allocation data stored on the mass memory 104 and mount a file system of the mass memory 104 to enable management of files, folders, and/or other data stored on the mass memory 104. In this regard, the file system management unit 114 may have read and write access to the mass memory 104.

The file system management unit 114 is configured to interface with the mass memory 104 over the interface 106. In at least some embodiments, the interface 106 comprises a wired bus internal to the host device 102 (e.g., in embodiments wherein the mass memory 104 is integrated into the host device 102 or inserted into a memory card receptacle of the host device 102). In some embodiments, the interface 106 comprises a wired communications link, wireless communications link, or some combination thereof over which data may be exchanged so as to allow the file system management unit 114 to exchange data with the mass memory 104 and/or controller unit 120. Examples of wired communications link embodiments of the interface 106 include, but are not limited to, a Universal Serial Bus (USB) cable, Firewire (Institute of Electrical and Electronics Engineers (IEEE) 1394) cable, parallel cable (IEEE 1284), serial cable (IEEE 1384), small computer system interface (SCSI), and/or the like. Examples of wireless communications link embodiments of the interface 106 include, but are not limited to, a Bluetooth™ connection, wireless local area network (WLAN) connection, such as in accordance with one of the 802.11 standards, other radio frequency communications interface standards, infrared (IR), wireless USB, and/or the like.

The mass memory 104 comprises a block-based memory, which may be embodied as a flash memory. The mass memory 104 is, in some embodiments, an integrated component of the host device 102. Alternatively, in some embodiments, the mass memory 104 is embodied as, for example, a flash memory card that may be connected to a port (e.g., a USB port), inserted into a memory card receptacle of the host device 102, or otherwise interface with the host device 102 over the interface 106. One or more blocks of the mass memory 104 store memory allocation data for one or more file systems that describe allocation of blocks within the mass memory 104. In this regard, each block of memory allocation data comprises a plurality of subunits (e.g., bytes, sectors, bits, pages, and/or the like), each of which may correspond to a block of the mass memory 104. A value of the subunit may denote whether a corresponding block is free or allocated. For example, a free block may be denoted by a '0' value, while an allocated block may be denoted by a '1' value. The memory allocation data may, for example, comprise a file allocation table (FAT), allocation bitmap, and/or the like depending on a file system(s) based at least in part upon which the mass memory 104 is formatted.

In some embodiments, controller unit 120 comprises a processing device, which may comprise a microprocessor, a coprocessor, a controller, or various other processing elements including integrated circuits such as, for example, an ASIC (application specific integrated circuit) or FPGA (field programmable gate array). In embodiments wherein the controller unit 120 is embodied as a processing device, the controller unit 120 may be configured to execute instructions stored in a memory (e.g., the memory 112 or mass memory 104) or otherwise accessible to the controller unit 120. In at least some embodiments wherein the controller unit 120 is not embodied as a processing device, the controller unit 120 is embodied as hardware, software, firmware, or some combination thereof that may be executed or otherwise controlled by the processor 110. Accordingly in such embodiments, the controller unit 120 may be in communication with the processor 110 over the interface 106.

In at least some embodiments, the file system management unit 114 is configured to read from and write to the mass memory 104. In exemplary embodiments, the file system management unit 114 is further configured to free and/or allocate blocks of the mass memory, such as by writing to memory allocation data based at least in part upon a file system format according to which the memory allocation data and corresponding blocks of the mass memory 104 is formatted. In this regard, the mass memory 104 may be formatted according to any of a plurality of available file system formats, such as, for example, FAT16, FAT32, NTFS, exFAT, EXT2/3, and/or the like. In some embodiments, the mass memory 104 is partitioned into a plurality of different file systems. Each file system in such embodiments may include its own individual corresponding memory allocation data formatted in accordance with the appropriate file system. Thus, the file system management unit 114 may be configured to mount or otherwise load each file system partition of the mass memory 104 and free and/or allocate blocks of each partition by writing to memory allocation data for each file system.

In an exemplary embodiment, erasure of freed blocks of the mass memory is handled by the controller unit 120. In order to enhance memory erase functionality, such as to allow erasure of freed blocks prior to the file system management unit 114 writing to a freed block that has not been erased, the file system management unit 114 is configured in at least some embodiments to report freed memory blocks to the controller unit 120. In this regard, the file system management unit 114 may be configured to generate and send an erase command to the controller unit 120 over the interface 106. The erase command may comprise an indication of a location of at least one block in the mass memory 104 storing memory allocation data for one or more blocks of the mass memory 104. The indicated location may comprise, for example, an indication of the location of a block, a sector number, and/or the like at which the first entry of the memory allocation data is located.

In at least some embodiments, the erase command further comprises information enabling the controller 120 to interpret the memory allocation data such that the controller 120 is able to identify blocks of the mass memory 104 freed by the file system management unit 114. The information included in the erase command is sufficient to enable the controller unit 120 to interpret the memory allocation data without knowledge of the underlying file system format of the memory allocation data and corresponding blocks of the mass memory 104 referenced by the memory allocation data. In this regard, the erase command may comprise an indication of a size of an entry in the memory allocation data. An entry in the memory allocation data comprises a subunit (e.g., 1 bit, 1 byte, 12/16/32 bits, 1 sector, and/or the like) of a block of the memory allocation data corresponding to a memory block and indicating the free/allocated status of the corresponding memory block.

The erase command may also comprise an indication of a value (e.g., '1,' '0,' or the like) of an entry denoting that a corresponding block is free.

The erase command may additionally comprise an indication of a number of entries in the memory allocation data. The indication of the number of entries in the memory allocation data is used to inform the controller unit 120 how many entries to access to determine blocks that have been freed for erasure by the file system management unit 114. The indication may, for example, comprise the actual number of entries in the memory allocation data or may comprise a size of the memory allocation data such that the controller unit 120 may use the indicated size of an entry in the memory allocation data and the size of the memory allocation data to determine the number of entries in the memory allocation data.

The erase command may further comprise an indication of a location in the mass memory corresponding to the first entry in the memory allocation data. This location may, for example, comprise a block and the first entry in the memory allocation data indicates whether the block (e.g. the block corresponding to the entry) is free or allocated. Based upon the location in the mass memory corresponding to the first entry, the controller unit 120 may determine the location corresponding to each subsequent entry in the memory allocation data, as each sequential subsequent entry in the memory allocation data corresponds to a sequential subsequent location (e.g., the next block) in the mass memory 104 from the indicated location corresponding to the first entry.

The erase command may also comprise an indication of a size of a block in the mass memory. Accordingly, the controller unit 120 may use the block size to determine locations of blocks corresponding to entries in the memory allocation data and may appropriately erase free blocks based at least in part upon the memory allocation data.

In some embodiments, the file system management unit 114 is configured to generate a free/used structure, such as a bitmap and write the free/used structure to a block(s) of the mass memory 104 when one or more partitions of the mass memory 104 is not formatted in accordance with a file system utilizing an allocation table or bitmap format for memory allocation data. The file system management unit 114 may utilize information pertaining to the free/used structure to generate the erase command so that the controller unit 120 may use the free/used structure to determine freed blocks that need to be erased without any knowledge of the underlying file system based at least in part upon which the mass memory 104 is actually formatted.

In instances wherein the mass memory 104 is partitioned into multiple partitions, the file system management unit 114 may be configured to send an erase command to the controller unit 120 for each file system partition on the mass memory, as necessary. Accordingly, the erase command for each partition may refer to the corresponding memory allocation data and include information to enable the controller unit 120 to interpret the specific format of the corresponding memory allocation data without knowledge of the underlying file system.

In at least some embodiments, the file system management unit 114 is configured to determine an appropriate time at which to send an erase command to the controller unit 120. This determination may be made, for example, to reduce overload on a bus or interface (e.g., the interface 106) over which data is communicated between the host device 102 and mass memory 104. Additionally or alternatively, this determination may be made based upon how busy the processor 110 is (e.g., how many tasks the processor 110 is performing) so as to reduce load on the processor 110. The determination may further take into account priority of tasks being executed or queued for execution by the processor 110 based at least in part upon how high of a priority is assigned to erasing freed blocks of the mass memory 104 by the file system management unit 114. The determination may also take into account state information about the host device 102 aside from processor and bus usage. For example, buffering instructions for execution by the processor 110 to send an erase command to the controller unit 120 and perhaps for erasing blocks of the mass memory 104 at the behest of the controller unit 120 may require buffering in the memory 112. If free space for buffering instructions in the memory 112 is running low, thrashing may occur and thus the file system management unit 114 may delay sending an erase command where such circumstances may occur. In another example, the host device 102 may be embodied as a mobile computing device powered by a battery. The file system management unit 114 may accordingly be configured to take into account battery life prior to sending an erase command to the controller unit 120 and may not send an erase command if remaining battery life is below a threshold value of time/power remaining so as not to risk operations of the host device 102 that may be more critical.

The controller unit 120 is accordingly configured to receive an erase command sent by the file system management unit 114. In at least some embodiments, the controller unit 120 is configured to access memory allocation data based at least in part upon the location of memory allocation data indicated in the received erase command. The controller unit 120 may be further configured to determine, based at least in part upon the memory allocation data, blocks within the mass memory 104 that have been freed by the file system management unit 114. In embodiments wherein the received erase command comprises information enabling the controller unit 120 to interpret the memory allocation data, the controller unit 120 may utilize the included information to assist in the determination of blocks within the mass memory that have been freed by the file system management unit 114. The controller unit 120 is configured in at least some embodiments to erase the blocks determined to be freed so that data may later be written to the freed blocks.

In at least some embodiments, the controller unit 120 is configured to determine whether the host device 102 has written data to the mass memory 104 after the controller unit 120 has accessed memory allocation data in response to receipt of an erase command, but prior to the controller unit 120 erasing blocks determined to be free. In this regard, the host device 102 may write to a block previously determined to be free and thus the controller unit 120 should not erase a block to which new data has been written to. Accordingly, in such embodiments the controller unit 120 is configured to access the memory allocation data and again determine blocks that have been freed prior to erasing freed blocks so as to avoid erasing data that has been written to previously freed blocks when the controller unit 120 determines that the host device 102 has written to the mass memory 104 following a previous access of memory allocation data in response to receipt of an erase command, but prior to the controller unit 120 erasing blocks determined to be free.

In at least some embodiments, the controller unit 120 is configured to securely erase freed blocks so that data erased from the freed blocks cannot be restored. In this regard, the controller unit 120 may be configured to perform erasure of freed blocks in accordance with a military or government specification, such as, for example, Department of Defense 5220.22M.

In instances wherein the mass memory 104 comprises a plurality of partitions, each of which may be formatted in accordance with a different file system, the controller unit 120 may be configured to receive an erase command from the controller unit 120 for each file system partition on the mass memory, as necessary. Accordingly, the erase command for each partition may refer to corresponding memory allocation data stored on the mass memory 104 for that partition and include information to enable the controller unit 120 to interpret the specific format of the corresponding memory allocation data without knowledge of the underlying file system.

In at least some embodiments, the controller unit 120 is configured to determine an optimum time to erase freed blocks following receipt of an erase command. The controller unit 120 may perform physical erasure of all free blocks which need to be erased (e.g., free blocks that are not already erased and ready for overwriting) immediately following receipt of the erase command. In some embodiments though, the controller unit 120 may delay erasing based upon available computing resources (e.g., available processor cycles of the processor 110 or the controller unit 120, if embodied as a processing device) or current conditions (e.g., battery power). The controller unit 120 may further be configured to utilize the information in the erase command and indicated memory allocation data to perform memory maintenance tasks, such as wear leveling.

Figure 3:
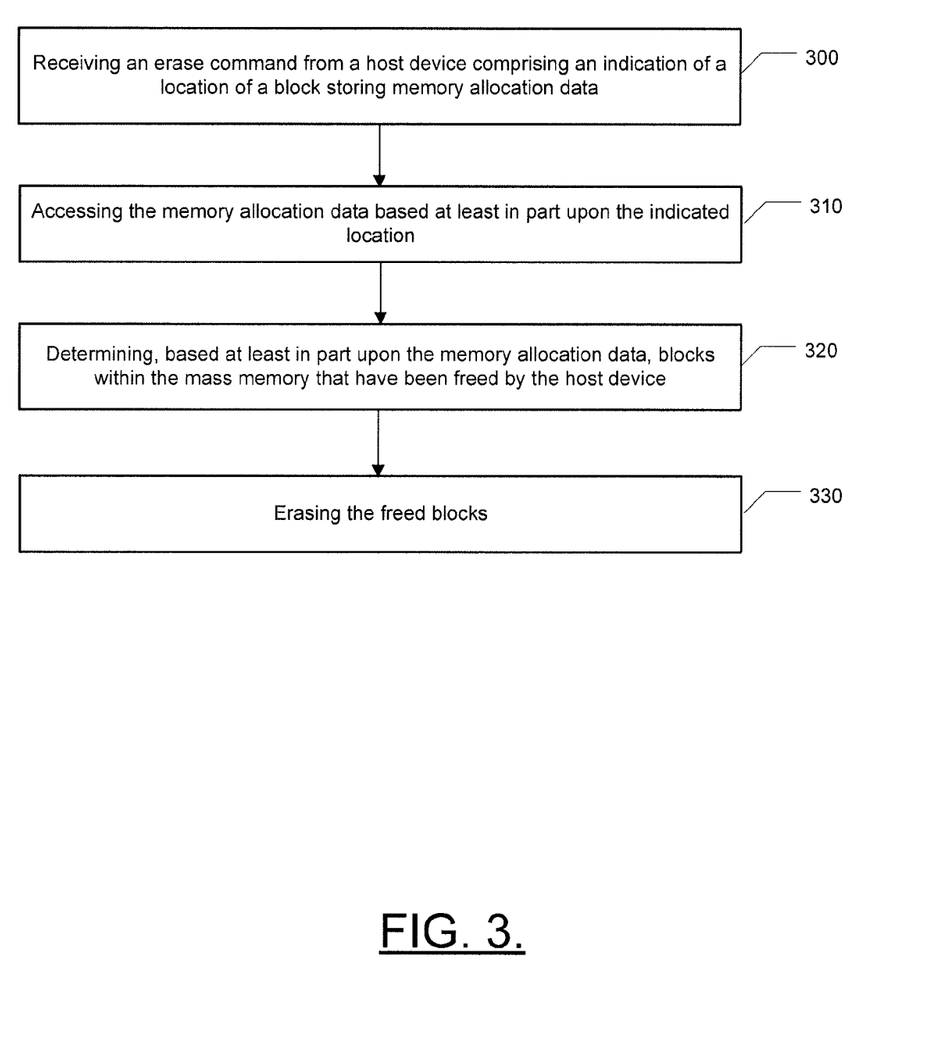
FIG. 3 is a flowchart according to an exemplary method for enhancing memory erase functionality according to an exemplary embodiment of the present invention.

FIG. 3 is a flowchart of systems, methods, and computer program products according to exemplary embodiments of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In this regard, one exemplary method for enhancing memory erase functionality according to an exemplary embodiment of the present invention is illustrated in FIG. 3. The method includes the controller unit 120 receiving an erase command from the host device 102, at operation 300. The erase command may comprise an indication of a location of a block in the mass memory 104 storing memory allocation data for one or more blocks of the mass memory. The erase command may further comprise information enabling the controller unit 120 to interpret the memory allocation data such that the controller unit 120 is able to identify blocks of the mass memory freed by the host device 102. Operation 310 comprises the controller unit 120 accessing the memory allocation data based at least in part upon the indicated location. The controller unit 120 determines, based at least in part upon the memory allocation data, blocks within the mass memory 104 that have been freed by the host device 102, at operation 320. Operation 330 comprises the controller unit 120 erasing the freed blocks.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, at least some embodiments of the invention provide several advantages. Embodiments of the invention provide methods, apparatuses, and computer program products for providing an erase command informing a controller unit embodied on a mass memory of free blocks on the mass memory so that the controller unit can erase the free blocks as necessary without requiring the controller unit to have any knowledge of an underlying file system. Embodiments of the invention utilize the erase command to enable pre-erasing of blocks marked as free by the host device prior to overwriting of the freed blocks. Pre-erasing in at least some embodiments of the invention speeds up write performance since there is not a need to wait for erasure of the blocks to which data is being written before the data is actually written. Embodiments of the invention further utilize the erase command to optimize timing of erasing so as not to tax computing resources.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, at a controller embodied on a block-based mass memory, an erase command from a host device in communication with the mass memory such that the host device has ability to read from and write to the mass memory and is configured to free one or more blocks of the mass memory by writing to memory allocation data stored in the mass memory prior to sending the erase command to the controller, wherein the erase command comprises a location of a block storing memory allocation data indicating whether each block of the mass memory has been freed by the host device;
accessing the block storing memory allocation data based at least in part upon the location included in the erase command;
determining, based at least in part upon the memory allocation data, at least one block within the mass memory other than the block storing memory allocation data that has been freed by the host device; and
erasing the at least one freed block in response to the erase command.

2. A method according to claim 1, wherein the host device has direct read and write access to the mass memory.

3. A method according to claim 1, wherein the erase command comprises one or more of the following:
an indication of a size of an entry in the memory allocation data,
an indication of a value of an entry denoting that a corresponding block is free,
an indication of a number of entries in the memory allocation data,
an indication of a location of a block in the mass memory corresponding to the first entry in the memory allocation data, and
an indication of a size of a block in the mass memory.

4. A method according to claim 1, wherein erasing the freed blocks comprises securely erasing the freed blocks so that data erased from the freed blocks cannot be restored.

5. A method according to claim 1, wherein:
receiving an erase command comprises receiving an erase command for each file system partition on the mass memory;
accessing the block storing memory allocation data comprises accessing the memory allocation data for each file system partition;
determining blocks within the mass memory that have been freed by the host device comprises determining blocks within each file system partition on the mass memory that have been freed by the host device; and
erasing the freed blocks comprises erasing the freed blocks in each file system partition.

6. A method according to claim 1, wherein the location of the block storing memory allocation data for one or more blocks of the mass memory further comprises a location of a block storing data comprising a free/allocated status of one or more blocks of the mass memory.

7. A method according to claim 1, wherein the mass memory comprises a flash memory.

8. A computer program product comprising at least one non-transitory computer-readable storage medium having computer-readable program instructions stored therein, the computer-readable program instructions comprising:
a program instruction for receiving, at a controller embodied on a block-based mass memory, an erase command from a host device in communication with the mass memory such that the host device has ability to read from and write to the mass memory and is configured to free one or more blocks of the mass memory by writing to memory allocation data stored in the mass memory prior to sending the erase command to the controller, wherein the erase command comprises a location of a block storing memory allocation data indicating whether each block of the mass memory has been freed by the host device;

a program instruction for accessing the block storing memory allocation data based at least in part upon the location included in the erase command;

a program instruction for determining, based at least in part upon the memory allocation data, at least one block within the mass memory other than the block storing memory allocation data that has been freed by the host device; and a program instruction for erasing the at least one freed block in response to the erase command.

9. A computer program product according to claim 8, wherein the host device has direct read and write access to the mass memory.

10. A computer program product according to claim 8, wherein the erase command comprises one or more of the following:
    an indication of a size of an entry in the memory allocation data,
    an indication of a value of an entry denoting that a corresponding block is free,
    an indication of a number of entries in the memory allocation data,
    an indication of a location of a block in the mass memory corresponding to the first entry in the memory allocation data, and
    an indication of a size of a block in the mass memory.

11. A computer program product according to claim 8, wherein the program instruction for erasing the freed blocks comprises instructions for securely erasing the freed blocks so that data erased from the freed blocks cannot be restored.

12. A computer program product according to claim 8, wherein:
    the program instruction for receiving an erase command comprises instructions for receiving an erase command for each file system partition on the mass memory;
    the program instruction for accessing the block storing memory allocation data comprises instructions for accessing the memory allocation data for each file system partition;
    the program instruction for determining blocks within the mass memory that have been freed by the host device comprises instructions for determining blocks within each file system partition on the mass memory that have been freed by the host device; and
    the program instruction for erasing the freed blocks comprises instructions for erasing the freed blocks in each file system partition.

13. A computer program product according to claim 8, wherein the location of the block storing memory allocation data for one or more blocks of the mass memory further comprises a location of a block storing data comprising a free/allocated status of one or more blocks of the mass memory.

14. A computer program product according to claim 8, wherein the mass memory comprises a flash memory.

15. An apparatus comprising a block-based mass memory and a controller, wherein the controller is configured to:
    receive an erase command from a host device in communication with the mass memory such that the host device has ability to read from and write to the mass memory and is configured to free one or more blocks of the mass memory by writing to memory allocation data stored in the mass memory prior to sending the erase command to the controller, wherein the erase command comprises a location of a block storing memory allocation data indicating whether each block of the mass memory has been freed by the host device;
    access the block storing memory allocation data based at least in part upon the location included in the erase command;
    determine, based at least in part upon the memory allocation data, at least one block within the mass memory other than the block storing memory allocation data that has been freed by the host device; and
    erase the at least one freed block in response to the erase command.

16. The apparatus of claim 15, wherein the host device has direct read and write access to the mass memory.

17. The apparatus of claim 15, wherein the erase command comprises one or more of the following:
    an indication of a size of an entry in the memory allocation data,
    an indication of a value of an entry denoting that a corresponding block is free,
    an indication of a number of entries in the memory allocation data,
    an indication of a location of a block in the mass memory corresponding to the first entry in the memory allocation data, and
    an indication of a size of a block in the mass memory.

18. The apparatus of claim 15, wherein the controller is configured to erase the freed blocks by securely erasing the freed blocks so that data erased from the freed blocks cannot be restored.

19. The apparatus of claim 15, wherein the controller is configured to:
    receive an erase command by receiving an erase command for each file system partition on the mass memory;
    access the block storing memory allocation data by accessing the memory allocation data for each file system partition;
    determine blocks within the mass memory that have been freed by the host device by determining blocks within each file system partition on the mass memory that have been freed by the host device; and
    erase the freed blocks by erasing the freed blocks in each file system partition.

20. The apparatus of claim 15, wherein the location of the block storing memory allocation data for one or more blocks of the mass memory further comprises a location of a block storing data comprising a free/allocated status of one or more blocks of the mass memory.

21. The apparatus of claim 15, wherein the mass memory comprises a flash memory.

\* \* \* \* \*